United States Patent
Cluckers et al.

(10) Patent No.: US 10,953,602 B2
(45) Date of Patent: *Mar. 23, 2021

(54) SYSTEMS AND METHODS FOR CUSTOMIZATION OF OBJECTS IN ADDITIVE MANUFACTURING

(71) Applicant: MATERIALISE N.V., Leuven (BE)

(72) Inventors: Tom Cluckers, Leuven (BE); Jan Maes, Leuven (BE)

(73) Assignee: Materialise N.V., Leuven (BE)

( * ) Notice: Subject to any disclaimer, the term of this patent is extended or adjusted under 35 U.S.C. 154(b) by 49 days.

This patent is subject to a terminal disclaimer.

(21) Appl. No.: 16/419,935

(22) Filed: May 22, 2019

(65) Prior Publication Data

US 2019/0332091 A1 Oct. 31, 2019

Related U.S. Application Data

(63) Continuation of application No. 15/305,125, filed as application No. PCT/EP2015/059509 on Apr. 30, 2015, now Pat. No. 10,331,111.

(60) Provisional application No. 61/986,697, filed on Apr. 30, 2014.

(51) Int. Cl.
*B29C 64/386* (2017.01)
*G06Q 30/06* (2012.01)
(Continued)

(52) U.S. Cl.
CPC ........... *B29C 64/386* (2017.08); *B33Y 10/00* (2014.12); *B33Y 50/02* (2014.12); *B33Y 80/00* (2014.12);
(Continued)

(58) Field of Classification Search
CPC ...... G05B 19/4099; G05B 2219/49007; G05B 2219/35134; B29C 64/386; B33Y 10/00;
(Continued)

(56) References Cited

U.S. PATENT DOCUMENTS

| 8,847,953 B1* | 9/2014 | Cho | G06T 19/006 345/420 |
| 2010/0042846 A1* | 2/2010 | Trotter | G06F 21/31 713/182 |

(Continued)

FOREIGN PATENT DOCUMENTS

| CN | 103730116 B | 8/2016 |
| EP | 2204136 A2 | 7/2010 |

(Continued)

OTHER PUBLICATIONS

Rui, Si, 3D Printed Eyeglasses Entered Customization Era, Aug. 12, 2013, https: //tech.qq.com/a/20130812/000417.htm.

(Continued)

*Primary Examiner* — Ziaul Karim
(74) *Attorney, Agent, or Firm* — Patterson + Sheridan, LLP

(57) ABSTRACT

Embodiments of this application relate to systems and methods which allow for 3-D printed objects, such as eyeglasses and wristwatches, for example, to be customized by users according to modification specifications that are defined and constrained by manufacturers based on factors relating to the printability of a modified design.

20 Claims, 16 Drawing Sheets

(51) Int. Cl.
*G06F 30/00* (2020.01)
*B33Y 10/00* (2015.01)
*B33Y 50/02* (2015.01)
*B33Y 80/00* (2015.01)
*G05B 19/4099* (2006.01)
*G06F 111/04* (2020.01)
*G06F 119/18* (2020.01)
*B29L 11/00* (2006.01)
*B29L 31/48* (2006.01)

(52) U.S. Cl.
CPC ......... *G05B 19/4099* (2013.01); *G06F 30/00* (2020.01); *G06Q 30/0621* (2013.01); *B29L 2011/00* (2013.01); *B29L 2031/48* (2013.01); *G05B 2219/35134* (2013.01); *G05B 2219/49007* (2013.01); *G06F 2111/04* (2020.01); *G06F 2119/18* (2020.01); *Y02P 90/02* (2015.11)

(58) Field of Classification Search
CPC .... B33Y 50/02; B33Y 80/00; G06Q 30/0621; G06F 17/50; G06F 2217/12; G06F 2217/06; B29L 2031/48; B29L 2011/00; Y02P 90/265
See application file for complete search history.

(56) References Cited

U.S. PATENT DOCUMENTS

| | | |
|---|---|---|
| 2011/0087350 A1 | 4/2011 | Fogel et al. |
| 2012/0235886 A1* | 9/2012 | Border .................. G06F 3/017 345/8 |
| 2013/0124151 A1 | 5/2013 | Mech et al. |
| 2013/0304604 A1* | 11/2013 | Hoffman ............ G06Q 30/0621 705/26.5 |
| 2013/0335416 A1* | 12/2013 | Coon ..................... G06T 17/20 345/423 |
| 2016/0310064 A1* | 10/2016 | Cheng ...................... A61B 5/11 |
| 2017/0053422 A1* | 2/2017 | Chojnowski ............. G06T 7/62 |

FOREIGN PATENT DOCUMENTS

| | | |
|---|---|---|
| JP | 2006-155638 A | 6/2006 |
| JP | 2009-294804 A | 12/2009 |
| JP | 2012-527702 A | 11/2012 |
| WO | 2013/177464 A1 | 11/2013 |

OTHER PUBLICATIONS

Search Report of Chinese Patent Application No. 2015800344435 dated Oct. 28, 2019.

* cited by examiner

SYSTEMS AND METHODS FOR CUSTOMIZATION OF OBJECTS IN ADDITIVE MANUFACTURING

CROSS-REFERENCE TO RELATED APPLICATIONS

This Application claims priority to U.S. patent application Ser. No. 15/305,125, filed on Oct. 19, 2016, which claims priority to International Application No. PCT/EP2015/059509, filed on Apr. 30, 2015, which claims the benefit of U.S. Provisional Patent Application No. 61/986,697, filed on Apr. 30, 2014, all of which are incorporated herein by reference in their entirety.

BACKGROUND OF THE INVENTION

Field of the Invention

This application relates to customization of 3-D printed objects. In particular, this application relates to systems and methods which allow end users and consumers to create customized objects based on modifications made to an existing 3-D printing design.

Description of the Related Technology

Traditionally, manufacturers of objects sold to consumers typically control the design and manufacturing process. For many of these items, the specifications are rigid and uncompromising. Traditional manufacturing processes often require the use of molds which are billed to manufacture specifications, and require significant effort and retooling to make modifications. Advancements in manufacturing technologies such as additive manufacturing (often referred to as three-dimensional ("3-D") printing), provide increased flexibility in allowing for modification of design specifications. To date, however, these benefits have been typically realized in the context of improving the design process by allowing for cheap and easy creation of rapid prototypes. There have been some efforts to allow end users or consumers to create their own product designs and then manufacture objects according to those design specifications using 3-D printing. However, consumers and end-users often lack the design skills needed to designs which meet professional standards from both an aesthetic and functional standpoint. Moreover, many consumers simply do not wish to invest the time needed to develop 3-D printing design specifications. Accordingly, improved techniques for allowing consumers to enjoy the benefits of 3-D printing technologies are needed.

SUMMARY

In one embodiment, a system for creating customized objects is provided. The system may include a design storage module comprising a memory configured to store a baseline 3-D design file for an object, customization data for the object, and product information associated with the object. The system may further include an application services module in data communication with the design storage module. The applications services module may comprise a user account management module comprising stored 3-D scanning data associated with a user and stored design customization data received from the user. The stored design customization data may be indicative of user-specified design modifications made to at least one stored design file in the design storage module. The application services module may further include a customization module configured to modify the baseline 3-D design file for the object based on input received from the user, and further configured to generate instructions for a graphical user interface superimposing the baseline 3-D design over the 3-D scanning data associated with the user. A web services module comprising an HTTP service may also be provided. The web services module may be configured to receive the generated instructions from the customization module and generate web page information indicative of the generated graphical user interface superimposing the baseline 3-D design over the 3-D scanning data associated with the user. The web services module may be further configured to transmit the generated web page information to an end-user device associated with the user, receive a user-input comprising user customization information, and transmit the user customization information to the application services module. The application services module may be further configured to modify the baseline design according to the user customization information and transmit the modified design to an additive manufacturing service for manufacturing of the customized object.

In another embodiment, a method of creating customized objects using additive manufacturing is provided. The method may include receiving a data indicative of a baseline 3-D design for an object, customization data for the object, and product information associated with the object. The method may further include receiving a 3-D scan image associated with an anatomical feature of a purchaser of the object and generating a graphical user interface superimposing the baseline 3-D design over the 3-D scanning data associated with the anatomical feature of the purchaser of the object. Web page information may be generated which is indicative of the generated graphical user interface, and the generated web page information may be transmitted to the purchaser of the product. The method also may include receiving customization information indicative of a customization of the object from the purchaser and modifying the baseline design according to the received customization information.

In another embodiment, a non-transitory computer readable medium comprising computer-executable instructions is provided. When the computer-executable instructions are executed by a processor, they may cause a computing device to perform a method of creating customized objects using additive manufacturing. The method may include receiving a data indicative of a baseline 3-D design for an object, customization data for the object, and product information associated with the object. The method may further include receiving a 3-D scan image associated with an anatomical feature of a purchaser of the object and generating a graphical user interface superimposing the baseline 3-D design over the 3-D scanning data associated with the anatomical feature of the purchaser of the object. Web page information may be generated which is indicative of the generated graphical user interface, and the generated web page information may be transmitted to the purchaser of the product. The method also may include receiving customization information indicative of a customization of the object from the purchaser and modifying the baseline design according to the received customization information.

DETAILED DESCRIPTION OF CERTAIN INVENTIVE EMBODIMENTS

Embodiments of this application relate to systems and methods which allow for 3-D printed objects, such as eyeglasses and wristwatches, for example, to be customized by users according to modification specifications that are defined and constrained by manufacturers. These modification specifications may be constrained by the manufacturers based on factors relating to the printability of a modified design. For example, utilizing systems and methods disclosed herein, a manufacturer may determine the extent to which a particular design modification may lead to an unprintable design. In some embodiments, the modification specifications may be defined as zones on the baseline design. These zones and their associated modification constraints may be interrelated. Based on their interrelationships, the modification constraints of the various zones may update in response to modifications made to other zones. Thus, embodiments disclosed herein allow designers and manufacturers to offer customers the ability to customize desired products based on the customer's stylistic preferences and/or physical characteristics, while at the same time maintaining sufficient control over the design as a whole so that the overall aesthetic qualities and functionality of the devices are not harmed.

Figure 1A:
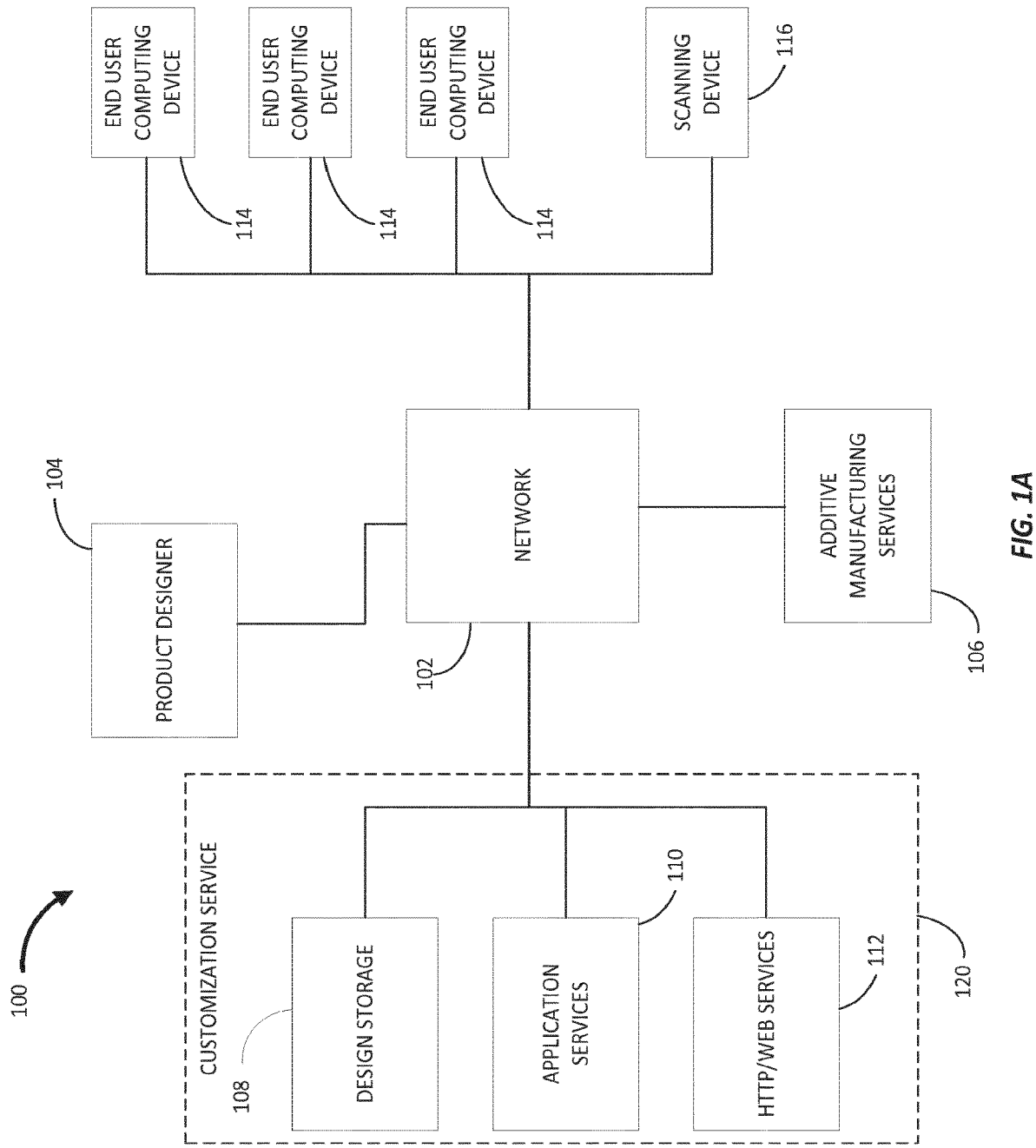
FIG. 1A is a block diagram providing an example of a computer network environment suitable for implementing various embodiments described herein.

Turning now to FIG. 1A, an example of a computer network environment 100 suitable for implementing various embodiments is shown. The network environment 100 includes a computer network 102. The computer network 102 may be any of various types and combinations of public and/or private networks. In some embodiments, the computer network 102 may be the Internet. In other embodiments, the computer network 102 may be a combination of the Internet and one or more private computer networks which are in data communication with the Internet via telecommunications routing equipment or some other means. In still other embodiments, the computer network may be a purely private network which uses proprietary protocols to transmit and receive data between various network devices.

The computer network environment 100 also may include a product design platform 104. The product design platform 104, typically associated with a product designer and/or manufacturer, provides a computing environment which allows a product designer and/or manufacturer to create three-dimensional designs for their products. Those designs may be stored in a format suitable for generating the designed product using additive manufacturing techniques such as three printing. In some embodiments, the designs may be stored in a 3-D printable STL file format. However, other suitable 3-D print formats may be used.

The computer network environment 100 may also include additive manufacturing services 106. The additive manufacturing services 106 may be in data communication with the computer network 102. The additive manufacturing services typically include advanced 3-D printing technology, which enables the manufacture of a product based on a 3-D printable file. In some implementations, the additive manufacturing services may be provided by the owner of the product design platform 104. Alternatively, the additive manufacturing services may be provided by a 3-D printer associated with a consumer. In still other embodiments, the additive manufacturing services 106 may be provided by an additive manufacturing service provider that specializes in providing those services to customers.

The computer network environment 100 may also include a customization service 120. The customization service 120 may generally take the form of one or more computer systems which provide customization services to customers who wish to order products manufactured or designed via the product design platform 104. In some embodiments, the customization service 120 may include design storage 108. The design storage 108 may include 3-D printable designs which have been placed in the design storage 108 by product designers. As will be discussed in further detail below, the design storage 108 may take the form of a network connected database which stores STL files and other 3-D printable file formats.

The customization service 120 may also include application services 110. The application services 110 typically take the form of one or more applications running on an application server which are configured to allow users to access design data stored in the design storage 108. As will be discussed in additional detail below, the application services 110 may be configured to generate user interface data which allows non-sophisticated users to make desired modifications to 3-D printing designs.

The customization service 120 may further include HTTP/web services 112. The HTTP/web services 112 typically take the form of a Web server which is in data communication with one or more of the application services 110 in the design storage 108. In some embodiments, the HTTP/web services 112 may be configured to provide browser-based access to the application services and design data provided within customization service 120. In some embodiments, the HTTP/web services 112 may utilize off-the-shelf ("OTS") software components. Alternatively, the HTTP/web services 112 may be provided through a customized and/or proprietary web interface.

The computer network environment 100 may also include one or more end-user computing devices 114. The end-user computing devices 114 are typically associated with customers and/or consumers who are considering purchases of products designed or sold by the designer and/or manufacturer 104. The end-user computing devices 114 may take various forms. In some embodiments, the end-user computing devices may be traditional personal computing devices running operating system such as Windows®, Linux, chrome OS, or Mac OS. The end-user computing devices 114 a also take the form of mobile telephone devices running mobile operating systems such as iOS, android, Windows mobile, or the like. The end-user computing devices 114 may also take the form of tablet computers, set-top box computers, or some other computer platform which can be used by an end user to connect to the computer network 102.

As will be discussed in detail below, some embodiments and users are able to customize manufactured objects to fit specific physical characteristics or attributes. To that end, the computer network environment 100 may also include a scanning device 116. The scanning device typically takes the form of a 3-D scanner which uses one or more cameras to develop a 3-D image of a scanned object. Additional details about the scanning device 116 will be provided below.

Figure 1B:
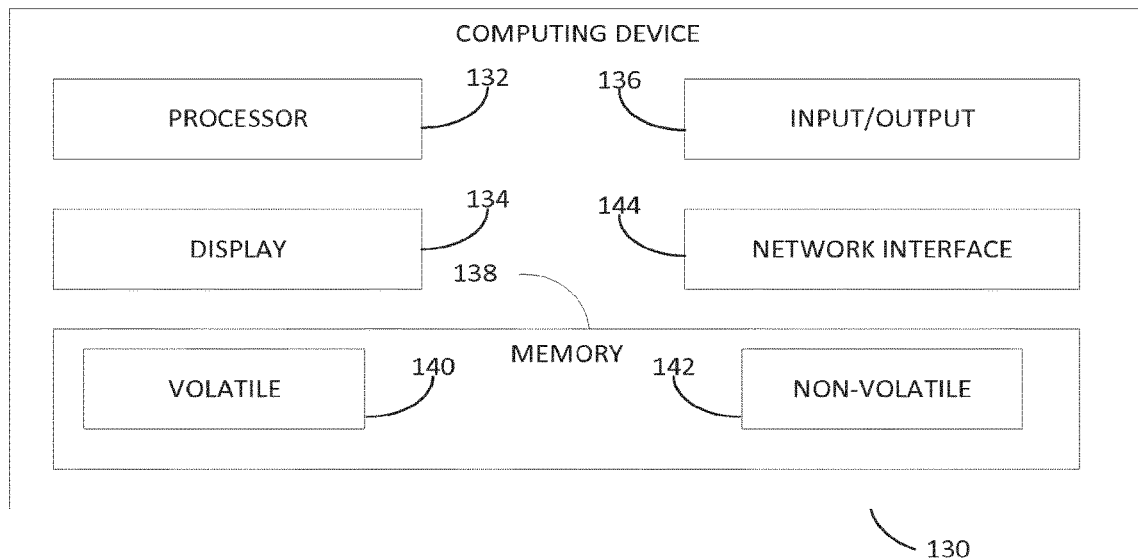
FIG. 1B is a block diagram of a computing device which may be used to performance various aspects of the embodiments described herein.

Turning now to FIG. 1B, an example of a computing device 130 that is suitable for implementing various aspects of the invention is shown. As noted above, end-user computing devices 114 may be of the various forms described. Other computers (as well as the end-user computing devices 114) present in the computer network environment 100 may also take the form of a computing device such as, for example, the computing device 130 shown in FIG. 1B. The computing device 130 includes a processor 132. The processor 132 may be a central processing unit ("CPU"), or it may be a multipurpose processing unit such as a system on a chip ("SOC") which provides both CPU services and other ancillary processing such as graphics, integrated network, or other features.

The computing device 130 may also include display 134. The display 134 may take various forms. In some embodiments, the display is integrated into the computing device 130. Alternatively, the display 134 may be a separate display (or multiple displays) configured to output information to a graphical user interface. The computing device 130 may further include an input/output system 136. The input/output system 136 typically includes various input devices which allow a user to interact with the computing device 130. The input devices may include a mouse, a keyboard, a touchscreen, a microphone, and the like. The input/output system 136 also typically includes output components. The output components may be the display 134, some sort of tactile feedback mechanism, an audio output device such as a speaker, or some other form of output device.

The computing device 130 may also include memory 138. The memory 138 is generally used to store information used in connection with the systems and methods described herein. The memory 138 may include volatile memory 140 such as some form of random access memory ("RAM"). The memory 138 may also include nonvolatile memory 142 which provides persistent storage of data. The nonvolatile memory 142 may take several forms. It may take the form of one or more hard disk drives, flash memory, read-only memory, optical disk, or some other form.

The computing device 130 may also include a network interface 144. The network interface 144 is typically a computer network interface card which provides access to the computer network 102 via any appropriate computer networking protocol. The network interface 144 may be a separate component of the computing device 130, or it may alternatively be part of the processing component 132. The network interface 144 may be a wired network interface, or maybe a wireless network interface.

Figure 1C:
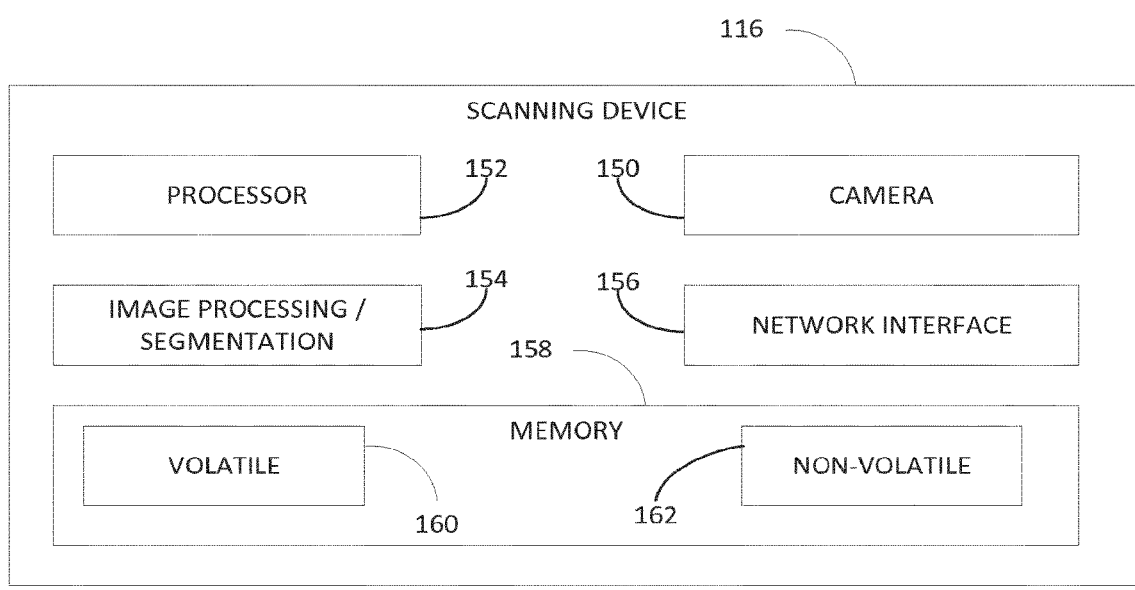
FIG. 1C is a block diagram showing an example of a scanning device which may be used in accordance with one or more embodiments.

As noted above in connection with FIG. 1A, the network environment 100 includes a scanning device 116. FIG. 1C is a block diagram providing an example of various components that may be included in a scanning device 116 in accordance with various embodiments described herein. In general, the scanning device is used to acquire 3-D the 3-D shape of a target object. The scanning device 116 may be a commercially available scanning device such as a 3DMD scanner, a GOM scanner, or a custom-built scanner. Alternatively, the scanning device 116 may be a specialized device which is designed to be fit for purpose. The scanning device 116 may implement any one of various 3-D scanning techniques to obtain 3-D scans of objects. These techniques may include contact-scanning. Alternatively, like-based 3-D scanners may also be used. In the examples described herein, the scanning device 116 utilizes passive scanning techniques.

In the example of a scanning device shown in FIG. 1C, the scanning device 116 typically includes a camera system 150. The camera system 150 may include a single camera which is maneuverable to acquire images from various perspectives. Alternatively, the camera system may include a plurality of cameras positioned at various angles and perspectives with respect to a target area for scanning. The images captured by the camera device 150 may be stored in memory 158. As was the case again with the computing device 130, the memory may include volatile memory 160 and/or nonvolatile memory 162. The scanning device 160 may also include a processor 152. As with the computing device 130 above, the processor 152 may be a standard CPU unit, or it may be a system-on-a-chip unit. In still other implementations, the processor 152 may include one or more specialized processing units which are designed for processing imaging data and driving the scanning device. The scanning device 116 may also include an image processing module 154. The image processing module 154 is typically configured to receive the images from the camera and process them in order to create a data set that can be converted into a 3-D design format.

Figure 2:
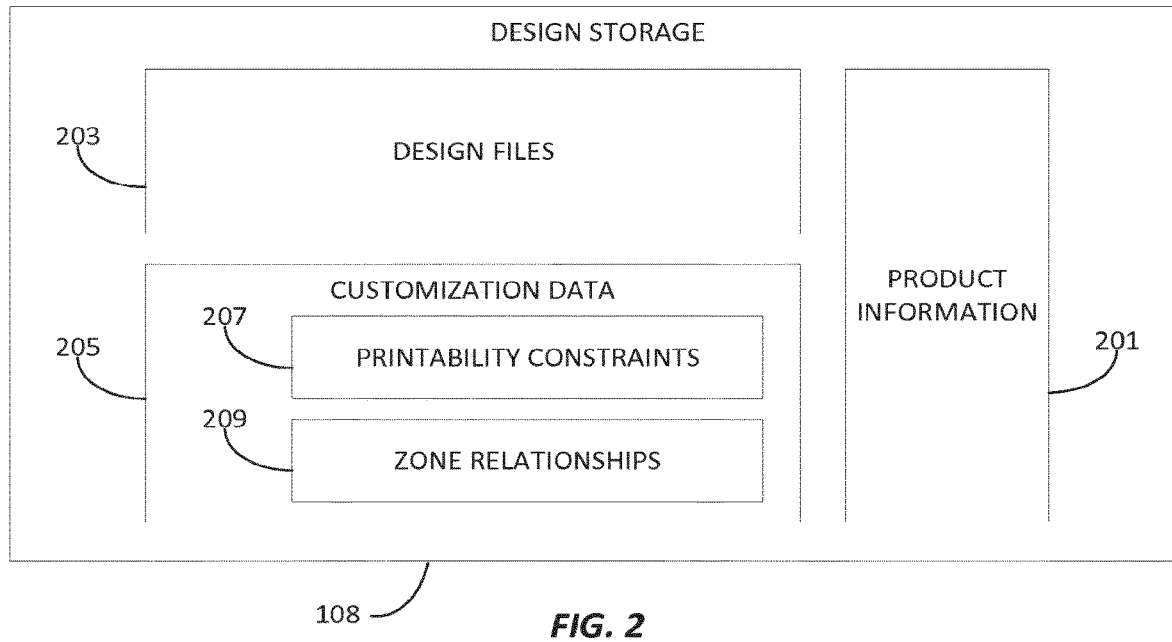
FIG. 2 is a more detailed view of the design storage shown in FIG. 1A.

As discussed above in connection with FIG. 1A, the computing environment 100 includes a customization service that allows for consumers to create customized designs for objects they wish to purchase. FIG. 2 is a more detailed view of the design storage 108 which they form part of the customization service 120. The design storage 108 may include product information 201. The product information 201 may take the form of general sales information about products available for purchase from manufacturers and/or designers. For example, the product information 201 may identify the product by name. The product information 201 may also have an SKU associated with the product, as well as pricing and shipping information. Product information

201 may further include descriptive information regarding the customizations that may be made to the product by the customer via the customization service 120.

The design storage 108 may also include design files 203. The design files 203 may take the form of original raw 3-D data such as an STL file, for example. These STL files (or other file format for a 3-D design) may be uploaded to the design storage 108 as baseline designs for products stored in the product information 201. The design files 203 may be uploaded by the product designer and/or manufacturer in order to make products associated with them available for sale via the customization service 120. Design storage 108 may also include customization data 205. The customization data 205 is generally data that defines how each design file 203 can be modified and customized according to the preferences of the consumer. In particular, the customization data 205 may define various zones of customization which allow an end-user to modify the sizing, spacing, and other dimensions of the product associated with the design.

Typically, the customization data 205 will include printability constraints 207 and zone relationships 209. The printability constraints 207 generally define changes that can be made to a particular design without detrimentally impacting the design to a point that it can no longer be successfully printed. In some embodiments, the printability constraints may be defined by the product manufacturer and/or designer as part of the general design process. Alternatively, the printability constraints 207 may be defined by the customization service 120 when the designs 203 are initially stored.

As noted above, the customization data 205 may also include zone relationships 209. The zone relationships 209 generally take the form of a data set that defines relationships between different zones of customization. For example, the zone relationships 209 may be defined so that when a modification is made to one zone defined in the customization data 205, changes are automatically made to other zones in response to that modification data. The zone relationships 209 may be used to provide the ability for end users to make more significant customizations without running afoul of the printability constraints 207 associated with a particular design file 203.

Figure 3:
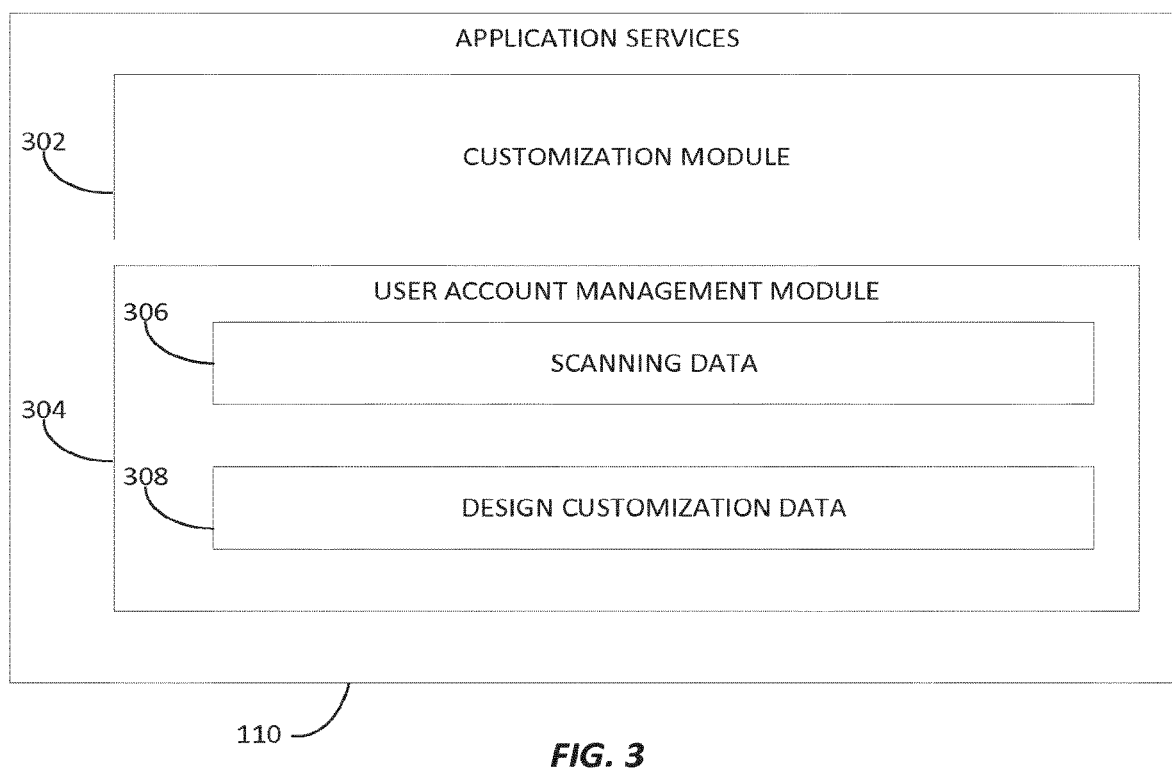
FIG. 3 is a more detailed view of the application services from FIG. 1A.

As noted previously in connection with FIG. 1A, the customization service 120 may also include application services 110. Turning now to FIG. 3, a more detailed view of the application services 110 is provided. The application services 110 may include a customization module 302. The customization module 302 is typically configured to generate a user interface which allows an end-user input the specific customizations that they desire based on the customization data 205 and associated with the design file 203. The customization module take the form of a graphical user interface ("GUI") which presents a visual 3-D representation of the product with GUI elements for modifying the design. These GUI elements may include linear sliders which allow the user to resize aspects of the design according to their design preferences. Typically, the customization module generates the GUI and GUI elements based on the information provided in the design files 203 and the customization data 205.

The application services 110 may also include user account management module 304. The user account management module 304 may be used to allow specific users to manage their designs and preferences according to one or more embodiments. As discussed above, in some embodiments and users are able to customize 3-D designs for apparel and/or accessories such as wristwatches and eyeglasses, for example. Allowing the users to customize these designs allows for users to create designs which suit their aesthetic tastes. Additionally, providing users with the ability to customize their designs using 3-D scans of their relevant body parts allows them to create better fitting products.

The user account management module 304 may be configured to store data which allows end-users to better fit products to their physical attributes and characteristics. As part of this configuration, the user account management module 304 may include scanning data 306. Scanning data 306 may include information associated with 3-D scans of body parts associated with the user. The 3-D scans may be taken using the scanning device 116 discussed above in connection with FIG. 1C. Scanning data may include, for example, 3-D scan data associated with the face and/or head of a user. As will be discussed in detail below, this 3-D scan data may be used to enable the user to make modifications to a 3-D design file for a pair of eyeglasses to best fit their physical characteristics. Scanning data 306 may also include 3-D scan data associated with the hand or wrist of the user. This hand/wrist scanning data may be used to assist the user in customizing a wrist watch band using the customization service 120.

The user account management module 304 may also include design customization data 308. The design customization data 308 may generally include data associated with past 3-D design modifications made by the user with respect to a manufactured object. The design customization data 308 may be generally provided to allow user registered in the system to reuse design customizations, or otherwise use them to better specify future customizations for similar types of products.

Figure 4:
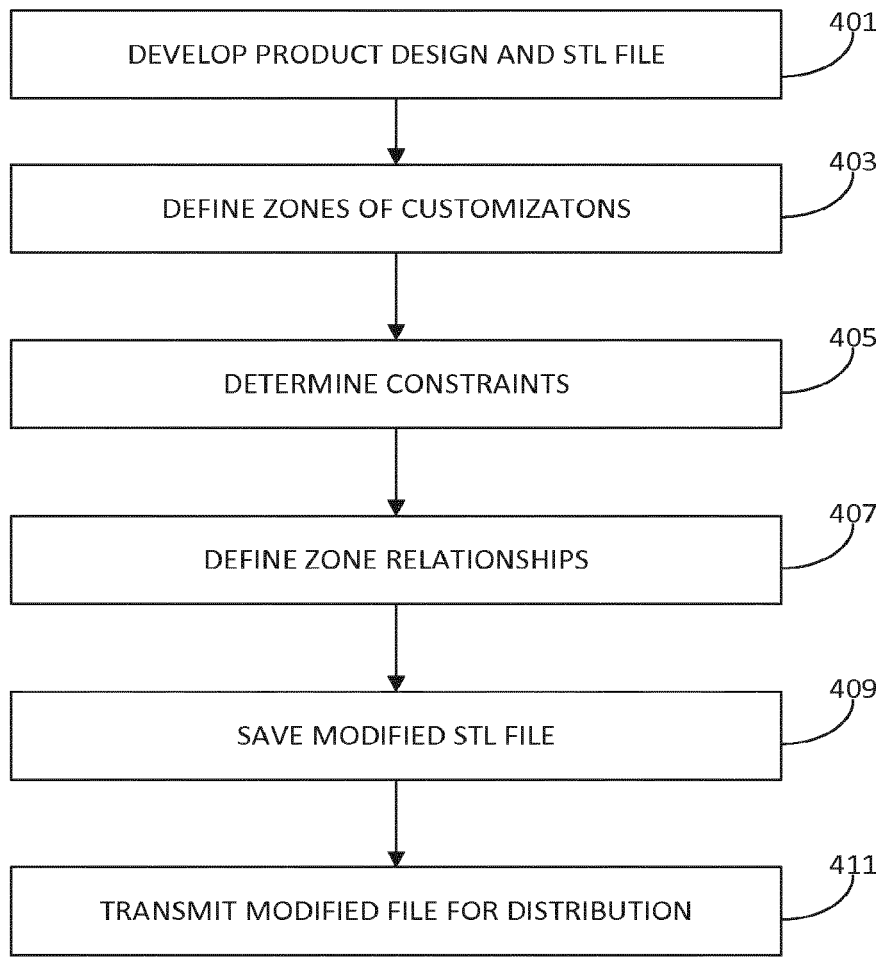
FIG. 4 is a flow chart showing a process by which a product design can create a customizable 3-D product design in accordance with one or more embodiments disclosed herein.

Turning now to FIG. 4, a flow diagram showing the high level process by which a designer/manufacturer can produce a customizable 3-D design is shown. The process begins at block 401, where the designer/manufacturer develops a product design and produces an STL file which is associated with that design. Next, the process moves to block 403. There, the designer/manufacturer may define zones of permitted customizations. Generally, the zones of permitted customizations may be defined by the designer/manufacturer to allow the customer to make customizations which fit their aesthetic design preferences, but do not change the key design and branding features associated with the object.

For example, a designer of eyeglasses may produce a design which has the lenses of a certain general shape. Because this shape is important to the stylistic aspects of that particular eyeglass model, the designer may decide to avoid making the shape of the lens a zone of customization. However, in order to ensure that the eyeglasses can be made to fit the customer in the best possible way, a designer may define zones of customization which allow the eyeglasses to be modified to better fit physical characteristics associated with the particular person for whom the eyeglasses are manufactured.

The process next moves to block 405, where constraints on the customization of a design may be determined. These constraints, are typically based on the printability of the modified design. For example, the constraints may be defined such that a modification (or combination of modifications) may be disallowed because the subsequently manufactured object will possess inherent structural deficiencies. In addition, certain modifications may be constrained because they result in a modified design that cannot be efficiently printed using the additive manufacturing services 106 which are associated with the manufacturing of that particular device.

The process may then move to block 407, where zone relationships may be defined. Zone relationships may be defined such that changes to one zone of customization may cause corresponding and/or related changes to a different zone of customization. The zone relationships may be defined such that these related changes automatically take place when certain triggering changes are made in a particular zone. Alternatively, the zone relationships may be defined so that the user is offered an optional corresponding change based on a defined zone relationship.

Once the product designer/manufacturer has defined each of the zone relationships, the process moves to block 409 where the designer/manufacturer may save the customization definition changes made to the STL file. Once those changes have been saved, the modified design file may be then transmitted to the design storage 108 within the customization service 120. There, the design can be made available to end users/customers so that they may customize their specific design for the manufactured product.

Figure 5:
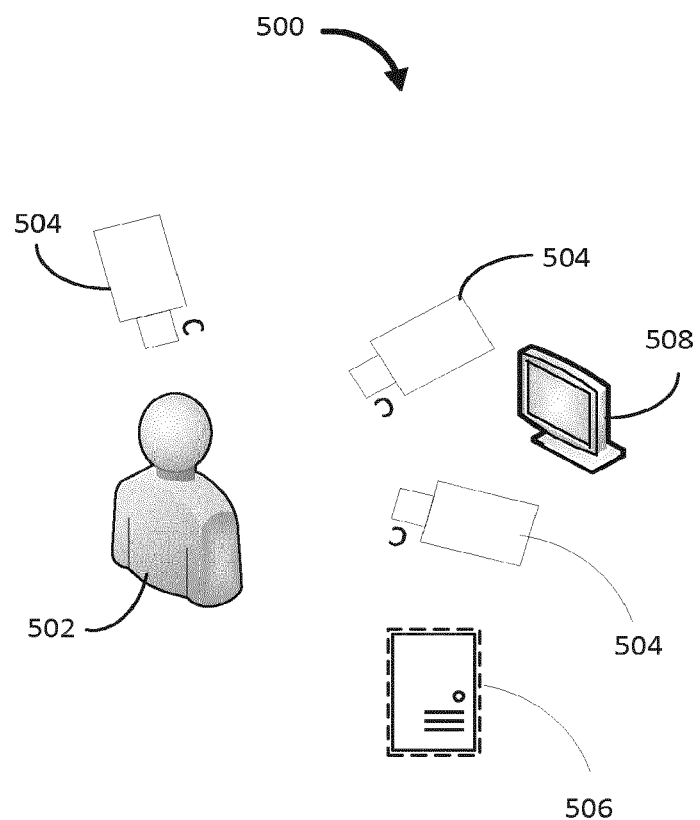
FIG. 5 is an example of an environment suitable for creating a three dimensional scan of a person in order to customize a 3-D printed object to their personal characteristics.

As noted above, in various embodiments, an end user may utilize the customization service 122 customize a 3-D printable design to best fit their physical characteristics. In some embodiments, a scanning device 160 may be used to scan the relevant body parts of the consumer so that they may utilize that 3-D scan to create a design that best fits their specific physical attributes. FIG. 5 is an example of one 3-D scanning environment 500 in which a user 502 may obtain a 3-D physical scan for use in connection with the scanning service 120.

As shown, the 3-D scanning environment 500 includes a scanning device having various different components. The components may include a series of cameras 504 attached to movable arms. The cameras in the movable arms may be controlled by controlling software and/or hardware 506 which may be provided by a standard personal computer, or alternatively by specialized scanning controller device. The environment may also include a video monitor 508. The video monitor 508 may be used as an input output device which allows for user interaction. For example, in some embodiments the video monitor five weight may be a touch screen which allows the user to input commands and otherwise control the operation of the 3-D scanning environment 500. Using this 3-D scanning environment 500, the user 502 may obtain 3-D scans of a selected part of their body, and then save those scans to a computer memory.

In the example shown in FIG. 5, the user 502 is having their face and head scanned by a 3-D scanning environment 500. Once the scan has been completed, the user may transmit the 3-D scan to the user account management module 304 within the application services 110 of the customization service 120. There, the user can use the 3-D scan as part of the fitting and design modification process for creating a customized design. In one particular example, the 3-D scan data may be used to assist a user in creating a customized design for a pair of eyeglasses.

Figure 6:
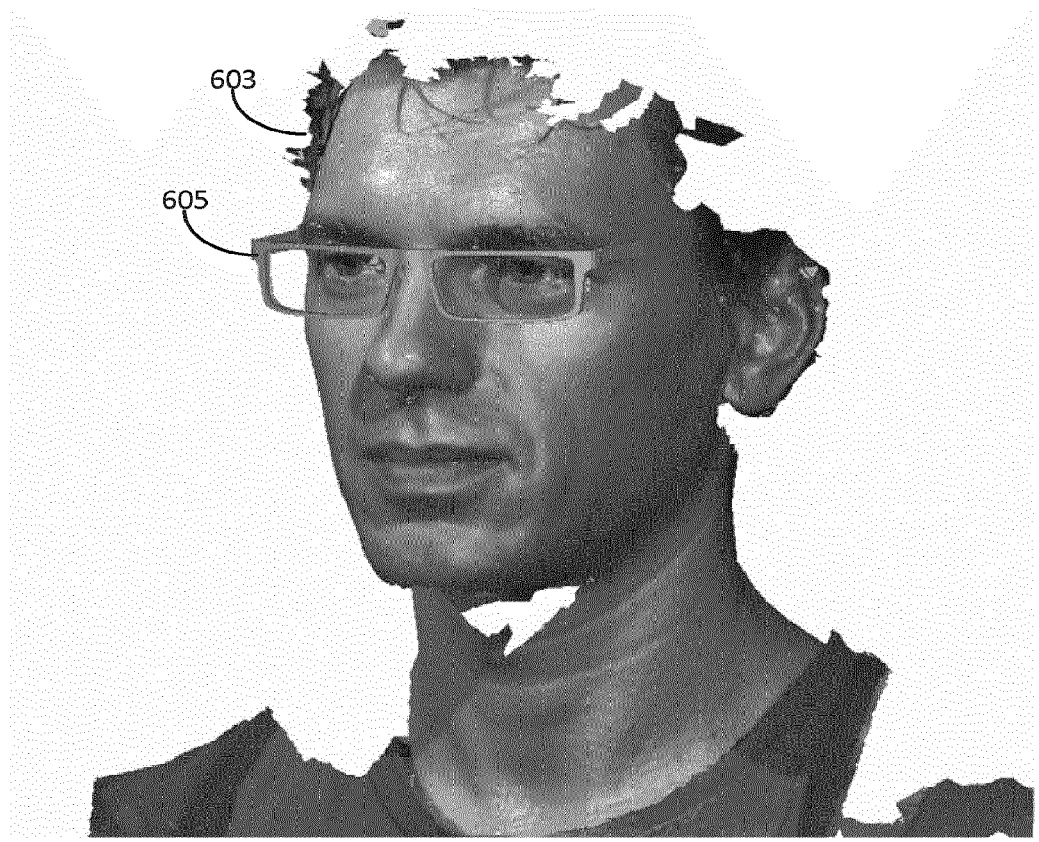
FIG. 6 is an example of a 3-D scan of a person's face may be used allow for customized design, fitting, and production of a pair of eyeglasses.

FIGS. 6-10 provide an illustration of how a 3-D scan obtained using the 3-D scanning environment 500 may be used in connection with creating a customized design for a pair of cycglasscs. Turning to FIG. 6, an example of a baseline graphical user interface showing a pair of eyeglasses 605 positioned on a 3-D scan image 603 of the face of the user is shown. This image may be generated by the customization module 302 by combining the scanning data 306 received from the user with the design file 203 (stored in design storage 108) and transmitting it via the HTTP/web services 112 to a browser associated with the end users computing device 114. Once the instructions for generating this graphical user interface has been delivered to the users computing device 114, the computing device may generate this baseline graphical user interface on its display. There, the end user may begin to work on customizing their eyeglasses design.

Figure 7A:
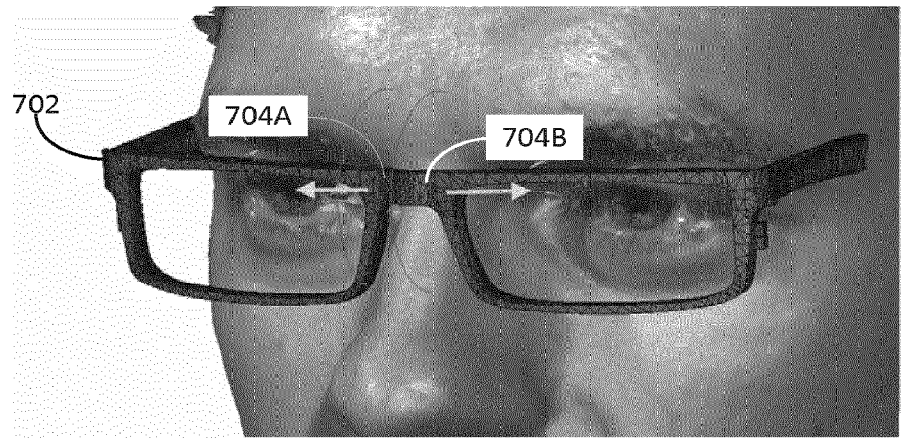
FIGS. 7A-7B provide an example of one customizable feature that may be defined for a pair of eyeglasses.

Once the baseline graphical user interface has been generated on the user computer 114, the graphical user interface may be enhanced to provide the user with graphical user face elements which allow for the customization of the baseline design presented in the graphical user interface. FIG. 7A is an example of an initial enhancement made to the graphical user interface to provide the user with the ability to customize the fit of the eyeglasses to the bridge of their nose. As shown, the graphical user interface may include two slider elements 704A and 704B. The slider elements 704A and 704B may be positioned on the rim 702 of the cycglasscs 603. The slider elements 704A and 704B may also include additional graphical indications to provide the user information on how those sliders may be adjusted in modifying the baseline design.

In this particular example, the slider 704A is accompanied by a leftward arrow which provides an indication to the end-user that it may be moved to the left. As that particular slider 704A is moved to the left, the arrow may change to be pointing in both directions, thereby telling the user that the slider can be moved in both a left and a right direction. Similarly, the slider 704B may be accompanied by a right facing arrow, indicating to the end-user that the slider may be moved in a rightward direction. And as was the case with slider 704A, the right facing arrow which accompanies slider 704B may change to be facing in both directions when the slider is moved to the right. This provides a similar indication to the end-user that the slider may be moved in either direction in order to modify the eyeglass design. The accompanying arrows may be used, in general, to let the user know of specific details about the customization data 205 associated with the design file 203 for that particular product. For example, the arrows may reflect a printability constraint 207 on the bridge portion of the eyeglasses design to find such that the bridge may only be widened or narrowed, and not lengthened or shortened vertically.

Figure 7B:
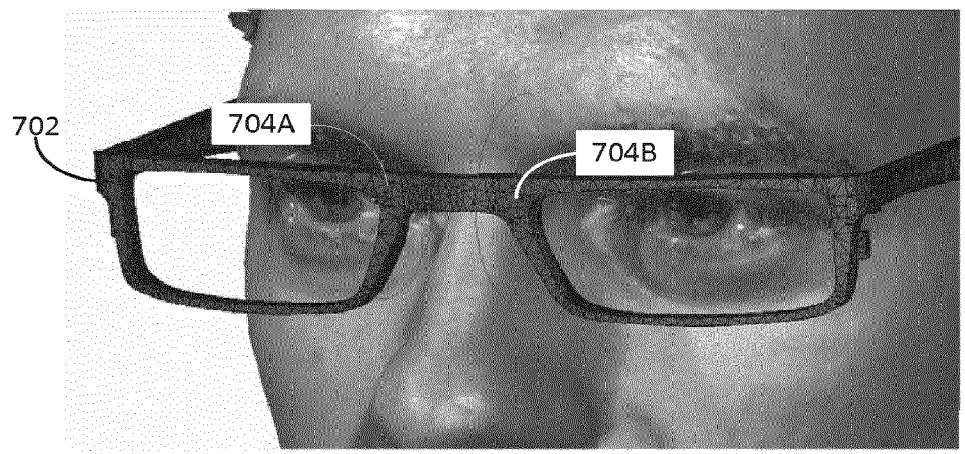

FIG. 7A shows the baseline design of the eyeglasses 603 with the modification sliders 704A and 704B positioned in a "narrow bridge" configuration. The end-user may, utilizing either a mouse, a touchscreen, or some other input device, maneuver the sliders in the FIG. 7B provides an illustration of how the sliders 704A and 704B may be moved and repositioned so that the bridge configuration becomes wider based on user input onto the graphical user interface which causes each slider to move in an outward direction. As shown, each of the sliders 704A and 704B have been moved so that the bridge is more loose-fitting on the nose of the end-user. As a result, the user can observe in real time, how their modification of the bridge portion of the eyeglasses frame impacts both the look and the fit of the frame on their specific physical features.

Figure 8A:
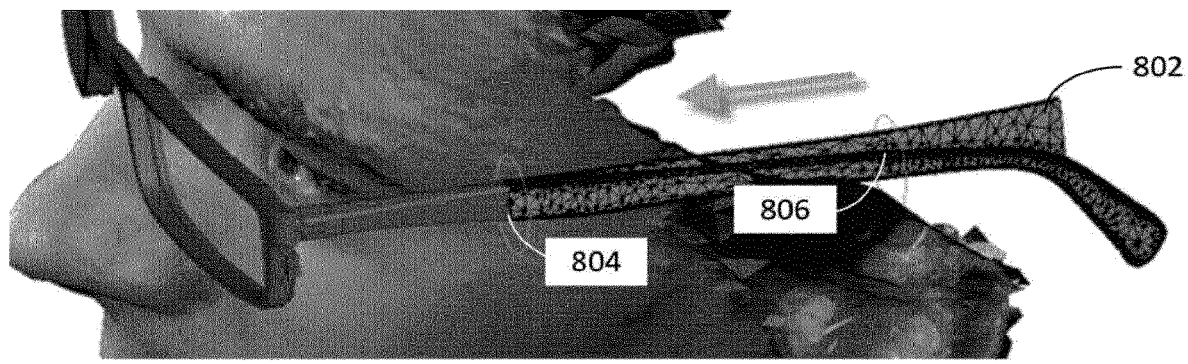
FIGS. 8A-8B provide another example of a customizable feature that may be defined for a pair of eyeglasses.
Figure 8B:
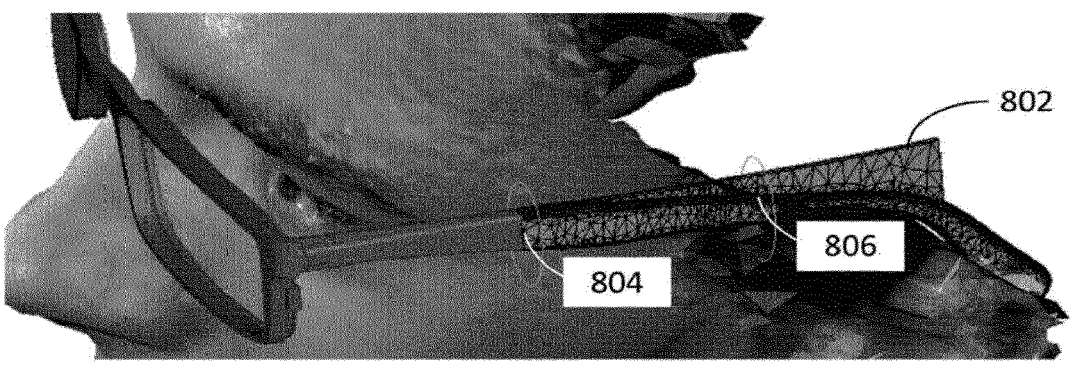

FIG. 8A provides an example of an additional portion of the baseline design which can be modified by the end-user on the end-user computing device 114. In this particular example, the arm piece 802 (sometimes called temples) of the eyeglass frame arm modifiable. As shown, the length of the arm piece arm 802 can be customized by the end-user by sliding the slider element 806 forward toward the face shown in the 3-D scan. As a result, the end-user is able to size the arm piece so that it fits with the specific location of their years. Turning now to FIG. 8B, the arm piece 802 shown after the slider element 806 has been moved forward towards the user's face. Although not utilized in this particular example, FIGS. 8A and 8B each show an additional slider element 804 which may also be maneuverable in order to adjust the length and sizing of the arm piece 802.

Figure 9A:
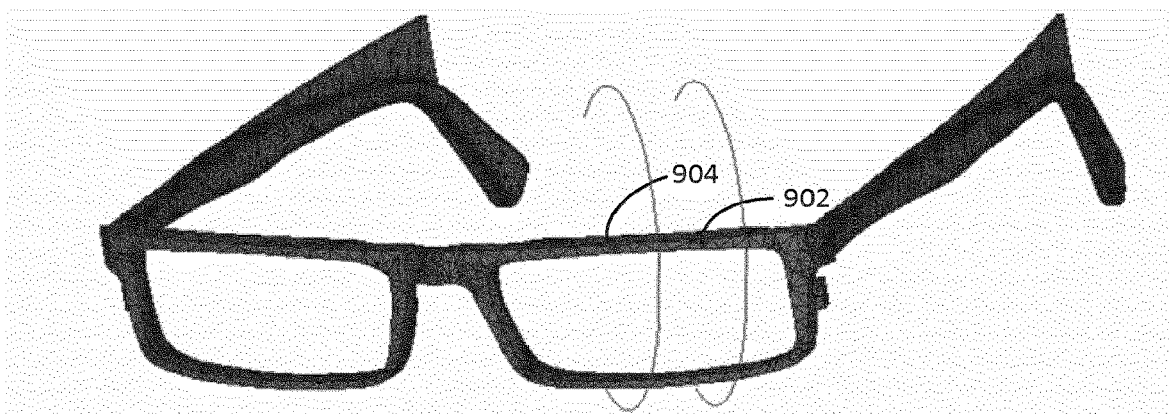
FIGS. 9A-9B provide an example of how different customizations may be made to each side of the glasses in order to accommodate the personal characteristics of the wearer.
Figure 9B:
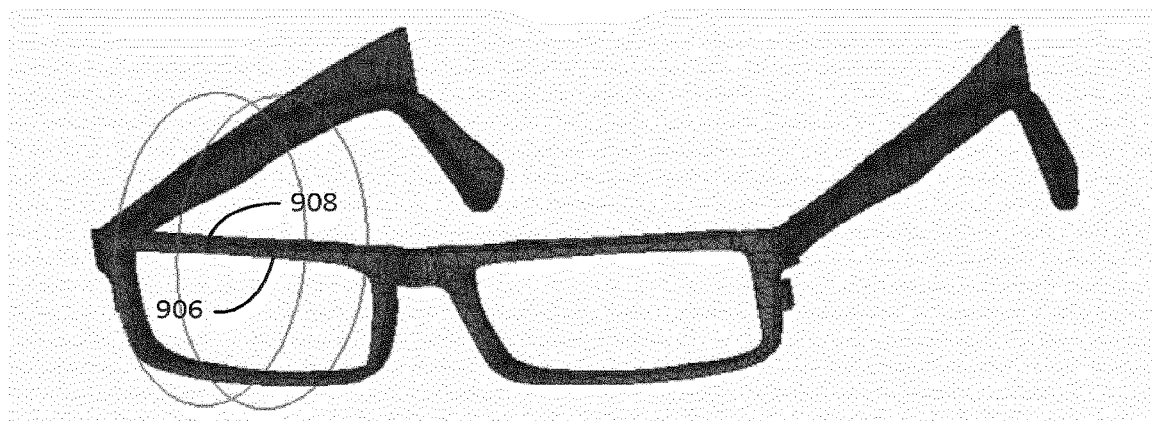

Other aspects of the eyeglass design may also be modifiable and/or customizable via the customization service 120. FIGS. 9A and 9B provide an illustration of how customization of the frame to accommodate the eye size of the user may be provided. As shown, in FIG. 9A, the lens portion of one side of the eyeglass frame may be customized using slider elements 902 and 904. Similarly, the lens portion of the other side of the eyeglass frame may be separately customized using slider elements 906 at 908. Thus, using the customization service 120, the user may be provided the ability to have a completely custom fit based on their specific physical attributes.

Figure 10:
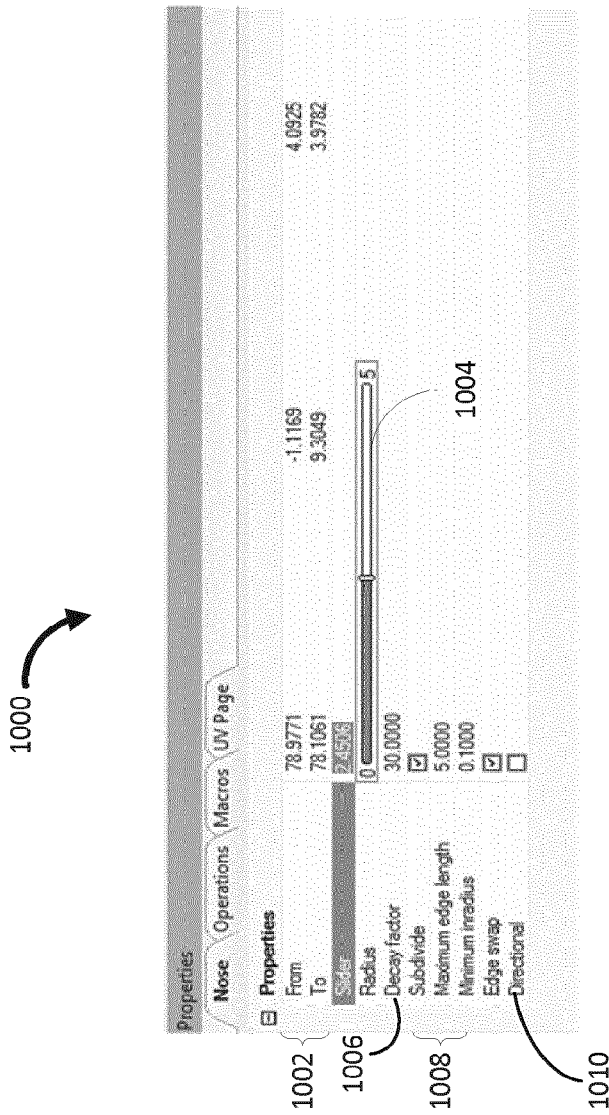
FIG. 10 is an example of a slider property which can be defined to implement the various customizations shown in FIGS. 7-9.

Turning now to FIG. 10, an example of a graphical user interface 1000 which may be used to define and modify the properties of one of the customization zones is shown. In this particular example, the zone of customization for the bridge portion of the eyeglasses is shown. The zone of customization may include various properties. In this example, the properties include From and To values 1002. These values are two 3-D points that define the axis along which the slider moves. The graphical user interface 1000 also includes a radius element 1004. The radius element 1004, in combination with the From and To values 1002, defines a cylinder in 3-D space. The defined cylinder provides the region of the object that will be modified by the user. The graphical user interface 1000 may also include a decay factor value 1006. The decay factor value, which is typically expressed in millimeters, describes the distance that can be used to generate a smooth transition between the modified region and remaining unmodified regions. In general, if the decay factor value is small, then there is an abrupt change in the design. If the decay factor is large, then there is a gradual transition from the unmodified regions to the modified region.

The graphical user interface 1000 may also include triangle management factors 1008. These include whether to subdivide triangles if they become too large as a result of design changes. In the example shown, a triangle will divide if its largest edge length is larger than the parameter Maximum edge length, or if its radius will be smaller than the minimum radius value. The graphical user interface 1000 may also include a directional selection 1010. The directional selection determines whether the sliders should be symmetric or direction. For example, the slider at the nose of the glasses would typically be symmetric. Other sliders, such as the wings of the eyeglasses, for example, may be directional.

Figure 11A:
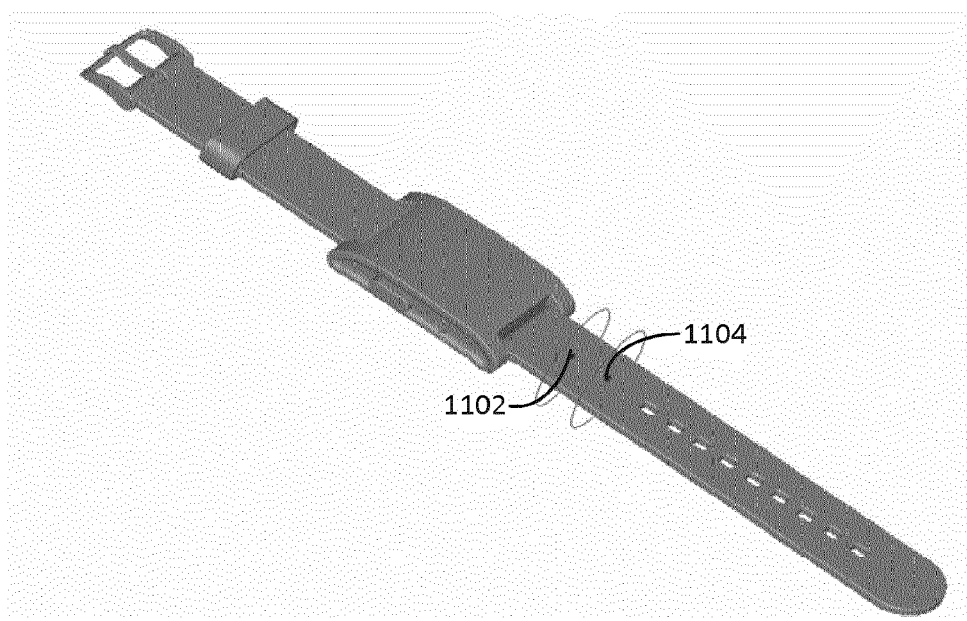
FIGS. 11A-11B provide an example of a customization that can be made to the design of a wrist watch.
Figure 11B:
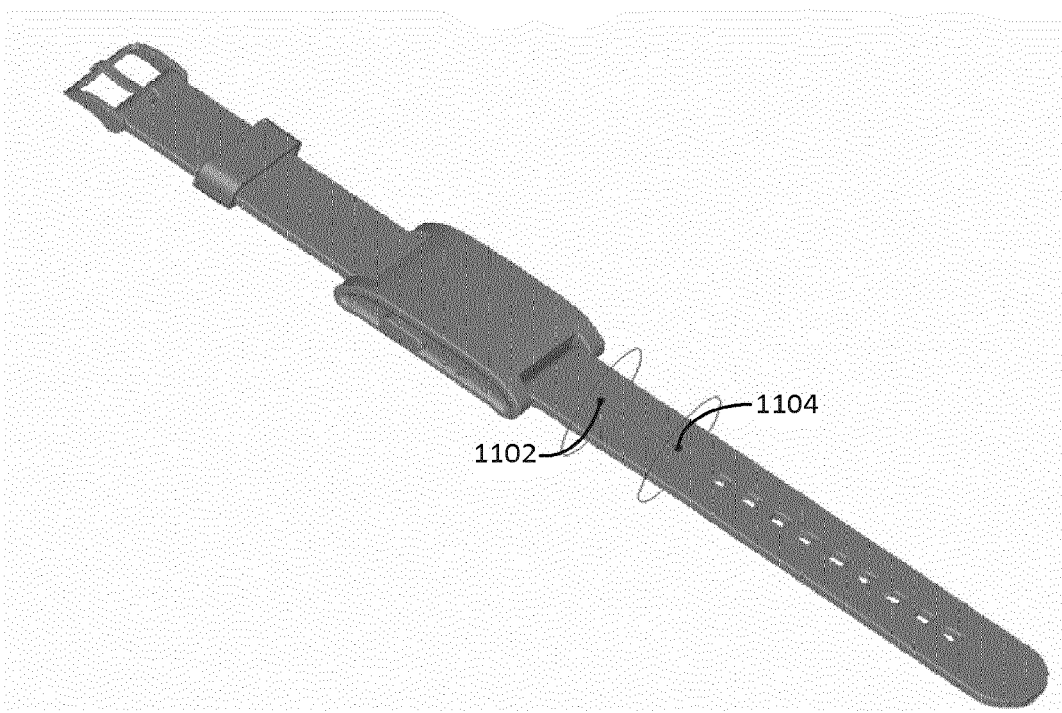

As discussed above, the customization service 120 may be used to allow a user to create a customized design for wearable products. In addition to eyeglasses, another example of a product suitable for designed via the customization service 120 is a wristwatch band. Turning now to FIG. 11A, an example graphical user interface for customizing and/or sizing a watchband 1100 is shown. Here, the watchband 1100 has to slider elements 1102 and 1104. Each of these slider elements may be modified to change the size of the watchband 1100. Although not shown in this example, it is to be appreciated that a 3-D scan of the wrists of the end-user may be utilized to show the fit of the watchband 1100 for the specific user customizing the design. FIG. 11B provides an illustration of the watchband 1100 after the slider element 1104 has been moved away from the slider element 1102, thereby increasing the size of the watchband.

Figure 12:
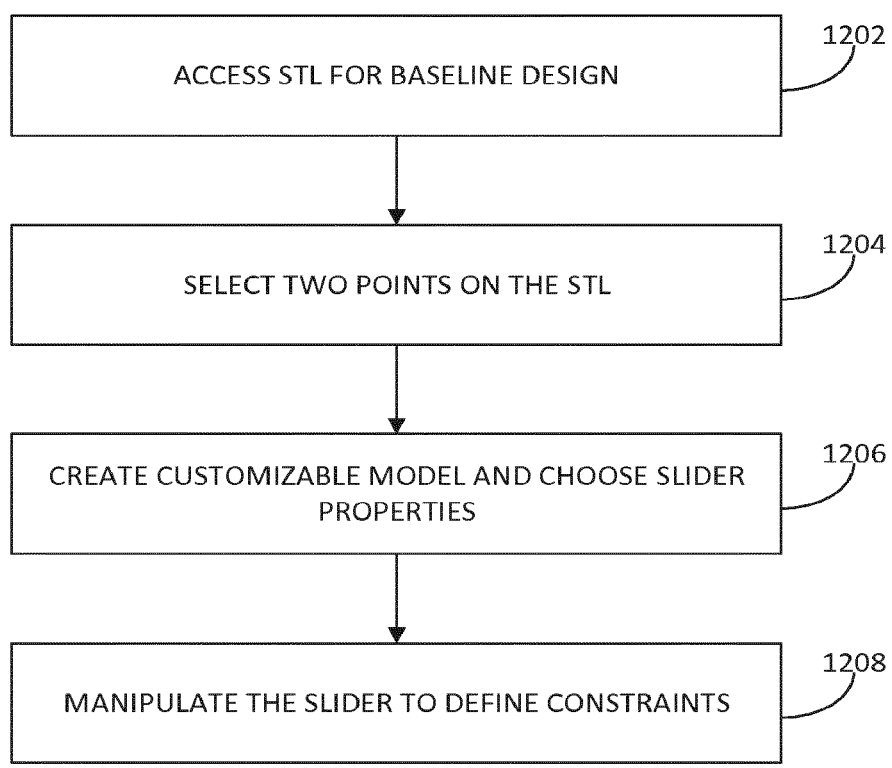
FIG. 12 is a flow chart of a process by which a product designer can add a new zone of customization to an existing 3-D product design.

As discussed above, the designer/manufacturer of a particular object may create zones of customization that allow end users to create customized designs from the baseline design offered by the designer/manufacturer. FIG. 12 is a flow diagram illustrating one process by which a new zone of customization (and its associated slider elements) may be created and incorporated into the baseline design.

The process begins at block 1202. There, the designer/manufacturer accesses the STL file associated with the baseline design. Next, at block 1204 the designer/manufacturer may choose two points on the STL which will define the zone of customization. The process then moves to block 1206, where the designer/manufacturer generates the zone of customization and defines the slider elements that are associated with it. Once the zone of customization and the slider elements have been defined, the process then moves to block 1208 where the slider elements are manipulated in order to define the modification constraints.

Figure 13A:
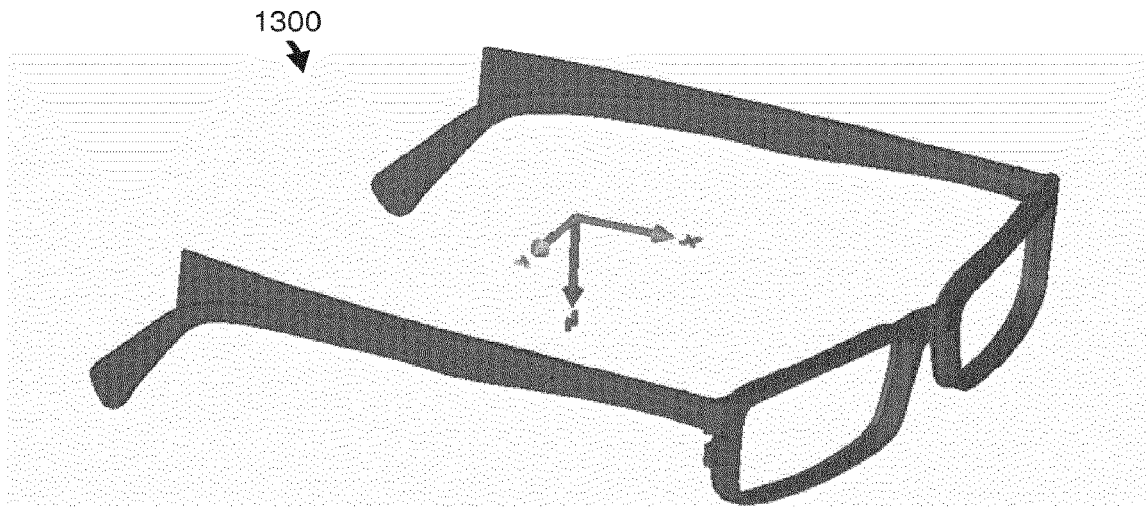
FIGS. 13A-13E are examples of graphical user interfaces which may be used to carry out the process of FIG. 12.
Figure 13B:
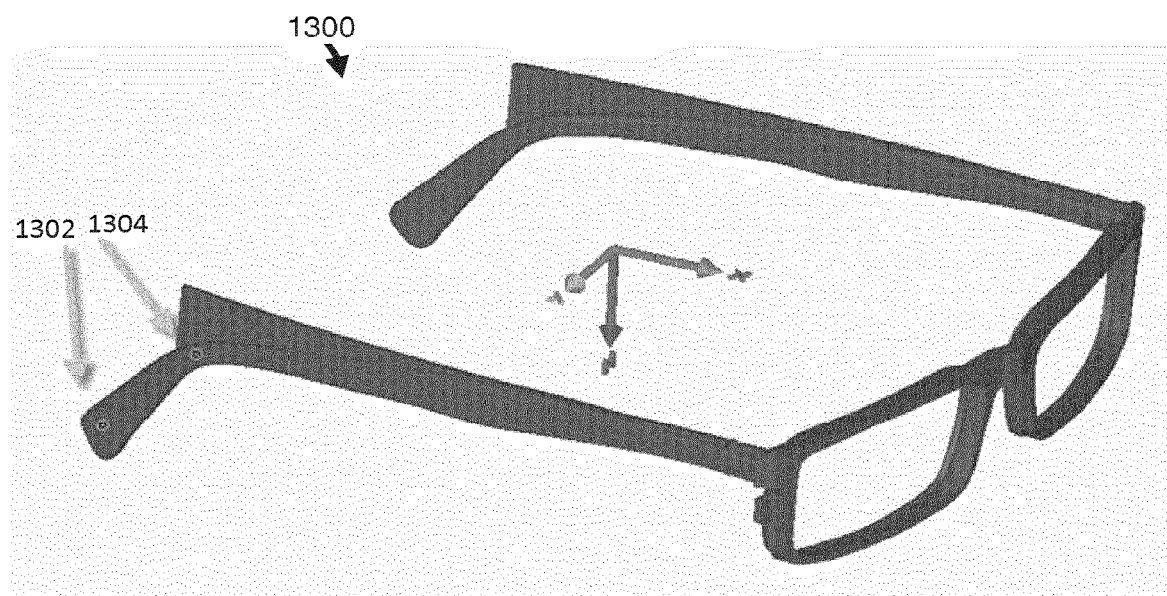

FIGS. 13A-13F provide an example of a graphical user interface which may be used to carry out the process shown in FIG. 12. FIG. 13A provides an example of a graphical user interface by which the designer/manufacturer accesses the STL of a pair of eyeglasses 1300. Turning now to FIG. 13B, an illustration of the graphical user interface after two points have been chosen as shown. Here the two points are identified as points 1302 and 1304.

Figure 13C:
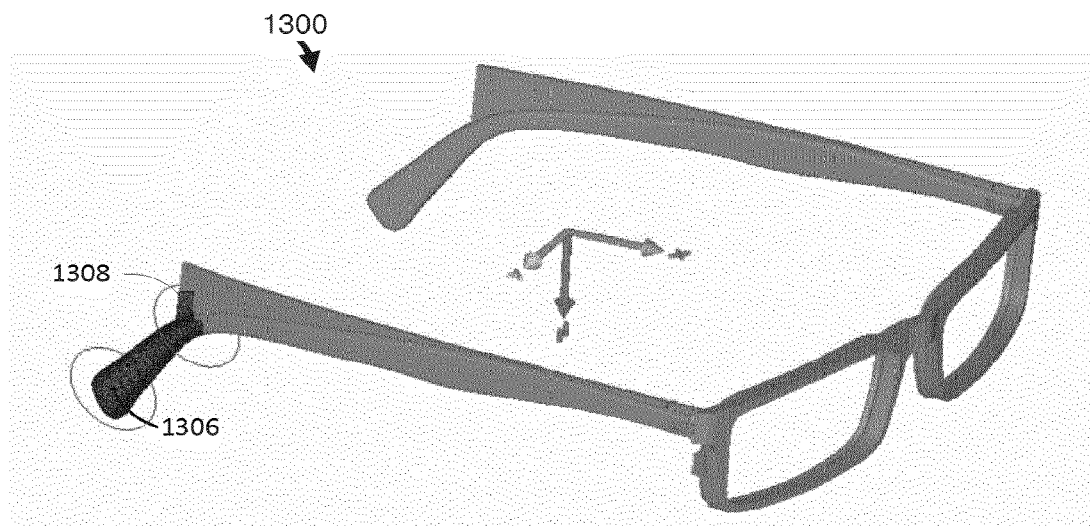
Figure 13D:
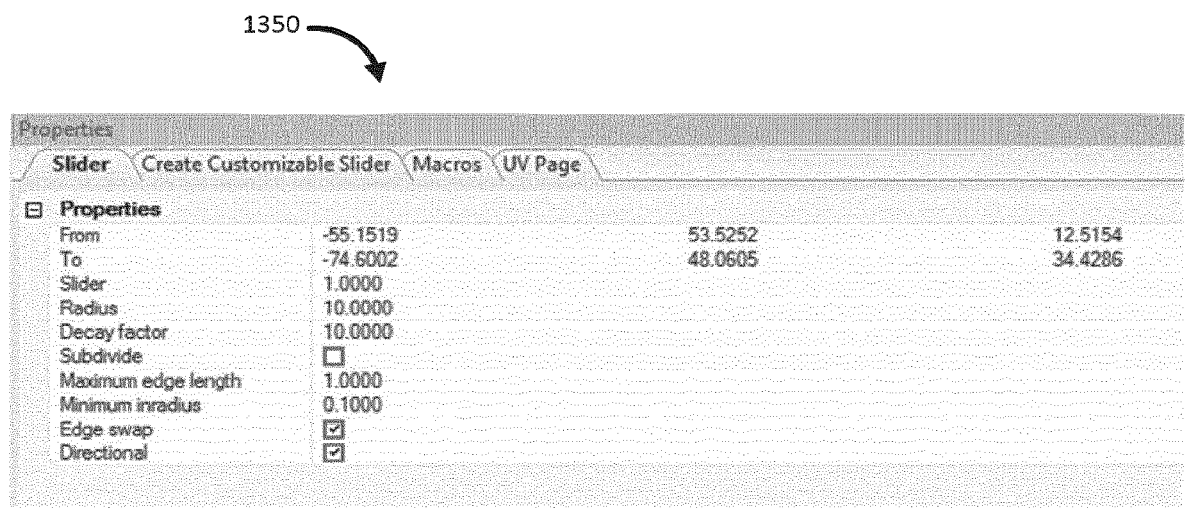

FIGS. 13C-13-D provide an illustration of step 1206 in which the designer/manufacturer generates zone of customization and define slider elements associated with it. As shown in FIG. 13C, two elements 1306 and 1308 have been placed at the points 1302 and 1304 from the previous step. These elements 1306 and 1308 are the points defined by "From" and "To" shown in FIG. 13D. The circles shown in FIG. 13C each correspond to the elements 1306 and 1308 and have a radius as defined by the radius element in FIG. 13D. Thus, the circles, in combination with the elements 1306 and 1308 form a cylinder, controlled by the parameters in FIG. 13D.

Figure 13E:
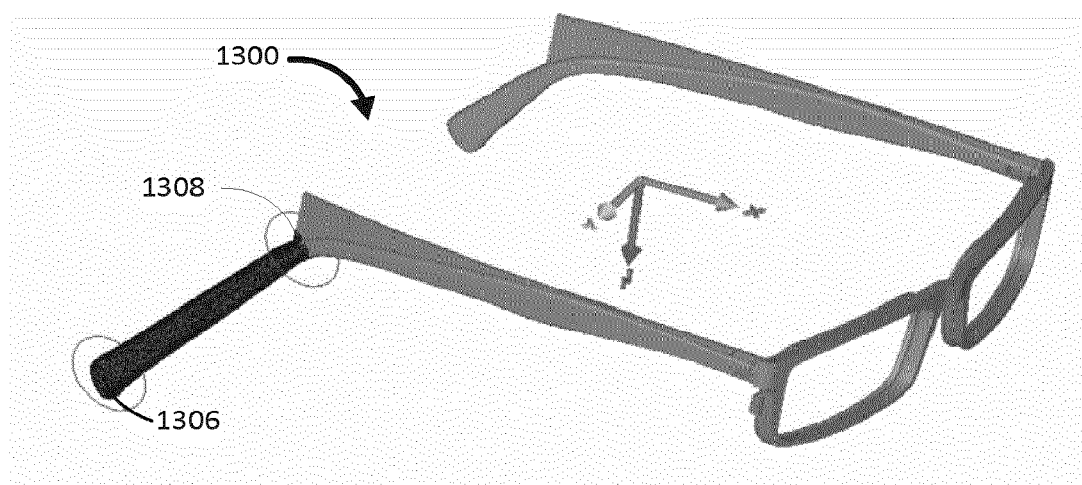

The defined zone of customization also may include triangles that are inside the cylinder which define the region that will be modified by the slider being created. In this particular example, the slider is "Directional", because the movement should not be symmetric movement, and instead should be movement in a single direction (e.g. lengthening or shortening the end of the earpiece). In this example the triangles in the baseline STL are small, therefore, there is no need for automatic subdivision. As a result, the "Subdivide" parameter is OFF in FIG. 13D. FIG. 13E provides an illustration of the step described in block 1208 where the slider elements are manipulated in order to define the modification constraint. As shown, the elements 1306 and 1308 have been moved to lengthen the earpiece of the design 1300.

Figure 14:
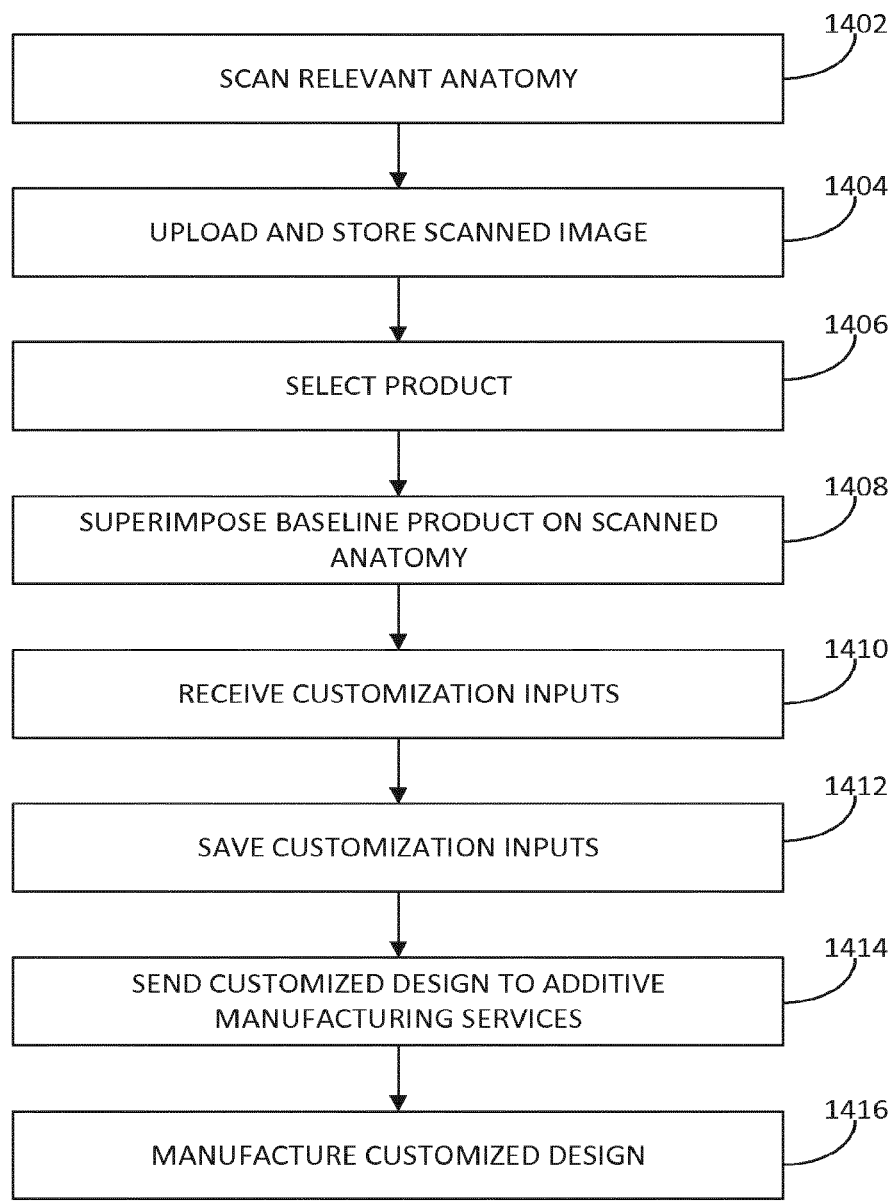
FIG. 14 is a flowchart showing the process by which an end-user can modify a product design according to their personal specifications in accordance with one or more embodiments.

FIG. 14 is a flow chart provide an example of the process by which an end-user can access the customization service to create a customized design for manufacturing a product using the customization service 120. The process begins at block 1402, where the end-user creates 3-D scan of their body. Next, at block 1404, the end-user uploads the 3-D scan to their scanning data 306 within the user account management module 304 of the application services 110.

The process next moves to block 1406. There, the user selects one of the products from the design storage 108. Once the product has been selected, the process then moves to block 1408 where the relevant portion of the 3-D scan uploaded by the user is presented with the baseline design of the selected product superimposed over the scanned body part. The process next moves to block 1410, where the user inputs there desired customizations. As discussed in detail above, these customizations may be based on zones of customization constrained by various factors such as printability, design aesthetics, and the like. In addition, in some embodiments, modifications to certain zones of customizability may automatically cause changes to other areas of the baseline design.

Once the user has finished putting their desired customizations, the customization service 120 may then save those customizations in the design customization data 308 associated with the user at block 1412. The process then moves to block 1414. There, the customized design is sent to the additive manufacturing services 106. Once the customized design has been received at the additive manufacturing services 106, the process then moves to block 1416 where the customized design is manufactured using the additive factoring services six.

Thus, using the process shown in FIG. 14, a consumer/end-user is able to customize the design of a product of interest to their exact specifications, and with the ability to define the specifications in view of their own physical attributes.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer implemented method of creating customized wearable products using additive manufacturing, the method comprising:
   receiving a 3-D printable file storing a baseline 3-D design for a wearable product, and customization data for the wearable product, the customization data defining zones of customization and printability constraints, a printability constraint defining changes that can be made to the baseline 3-D design without detrimentally impacting the baseline 3-D design to a point that it can no longer be successfully printed such that it would at least one of possess structural deficiencies when manufactured using additive manufacturing or could not physically be manufactured using additive manufacturing;
   receiving 3-D scanning data associated with an anatomical feature of a user of the wearable product;
   receiving customization information indicative of a customization of the baseline 3-D design based on the 3-D scanning data;
   modifying the baseline 3-D design according to the received customization information and the customization data, wherein the modifying comprises modifying the baseline 3-D design at one or more different zones according to the customization information thus obtaining a modified 3-D printable file, wherein the modified 3-D printable file is usable by an additive manufacturing service to manufacture the wearable product.

2. The method of claim 1, further comprising generating the customization data for the wearable product, wherein generating the customization data comprises determining the printability of a proposed modification of the baseline 3-D design.

3. The method of claim 1, further comprising:
   generating a graphical user interface superimposing the baseline 3-D design over the 3-D scanning data associated with the anatomical feature of the user of the wearable product;
   generating web page information indicative of the generated graphical user interface; and
   transmitting the generated web page information to the user of the wearable product.

4. The method of claim 3, wherein the generated web page information comprises a plurality of visual elements used to modify the baseline 3-D design.

5. The method of claim 4, wherein the plurality of visual elements comprise slider elements, and wherein movement of the slider elements is indicative of a change to the physical dimensions of the baseline 3-D design.

6. The method of claim 1, wherein the customization data for the wearable product comprises permitted customizations of the baseline 3-D design.

7. The method of claim 6, wherein the permitted customizations preserve structure of the wearable product and/or ability of the wearable product to be printed using additive manufacturing.

8. The method of claim 1, wherein the printability constraints are based on at least one of wall thickness, deformation risk, dimensional accuracy, surface roughness, overhang angles, support structure minimalization, build orientation, and slice complexity.

9. The method of claim 1, wherein the customization data comprises zone relationship data, and wherein when a modification is made to one zone of the plurality of zones of modification, changes are automatically made to one or more other zones of modification.

10. The method of claim 1, wherein the 3-D printable file is represented in an STL file format.

11. The method of claim 1, wherein the modifying comprises modifying the 3-D printable file at one or more different zones according to the customization information and printability constraints.

12. The method of claim 1, wherein the anatomical feature of the user is the face.

13. The method of claim 1, wherein the customizations of the baseline 3-D design comprise changes to the sizing, spacing, and dimensions of the baseline 3-D design.

14. A non-transitory computer readable medium comprising computer-executable instructions, which, when executed by a processor, cause a computing device to perform a method of creating customized wearable products using additive manufacturing, the method comprising:
   receiving a 3-D printable file storing a baseline 3-D design for a wearable product, and customization data for the wearable product, the customization data defining zones of customization and printability constraints, a printability constraint defining changes that can be made to the baseline 3-D design without detrimentally impacting the design to a point that it can no longer be successfully printed such that it would at least one of possess structural deficiencies when manufactured using additive manufacturing or could not physically be manufactured using additive manufacturing;
   receiving 3-D scanning data associated with an anatomical feature of a user of the wearable product;
   receiving customization information indicative of a customization of the baseline 3-D design based on the 3-D scanning data; and
   modifying the baseline 3-D design according to the received customization information, wherein the modifying comprises modifying the baseline 3-D design at one or more different zones according to the customization information thus obtaining a modified 3-D printable file.

15. The non-transitory computer readable medium of claim 14, wherein the customization data comprises zone relationship data, and wherein when a modification is made to one zone of the plurality of zones of modification, changes are automatically made to one or more other zones of modification.

16. The non-transitory computer readable medium of claim 14, wherein the anatomical feature of the user is the face.

17. A system for creating customized wearable products, comprising:
- a design storage module comprising a memory configured to store a 3-D printable file storing a baseline 3-D design file for a wearable product, customization data for the wearable product, the customization data defining zones of customization and printability constraints, a printability constraint defining changes that can be made to the baseline 3-D design without detrimentally impacting the design to a point that it can no longer be successfully printed such that it would at least one of possess structural deficiencies when manufactured using additive manufacturing or could not physically be manufactured using additive manufacturing;
- an application services module in data communication with the design storage module, the applications services module comprising:
  - a user account management module comprising stored 3-D scanning data associated with an anatomical feature of a user and stored design customization data received from the user, the stored design customization data indicative of user-specified design modifications made to at least one stored design file in the design storage module;
  - a customization module configured to modify the baseline 3-D design file for the wearable product based on input received from the user; and
- a services module configured to:
  - receive a user-input comprising user customization information indicative of a customization of the baseline 3-D design; and
  - transmit the user customization information to the application services module,
- wherein the application services module is further configured to modify the baseline 3-D design according to the user customization information and the customization data, wherein the modifying comprises modifying the 3-D design at one or more different zones according to the customization information thus obtaining a modified 3-D printable file, wherein the modified 3-D printable file is usable by an additive manufacturing service to manufacture the wearable product.

18. The system of claim 17, wherein the customization data comprises zone relationship data, and wherein when a modification is made to one zone of the plurality of zones of modification, changes are automatically made to one or more other zones of modification.

19. The system of claim 17, wherein the anatomical feature of the user is the face.

20. The system of claim 17, wherein the printability constraints are based on at least one of wall thickness, deformation risk, dimensional accuracy, surface roughness, overhang angles, support structure minimalization, build orientation, and slice complexity.

* * * * *